(12) United States Patent
McRae et al.

(10) Patent No.: US 9,642,174 B2
(45) Date of Patent: *May 2, 2017

(54) SECURE PAIRING OF NETWORKED DEVICES (71) Applicant: BELKIN INTERNATIONAL, INC., Playa Vista, CA (US)

(72) Inventors: Matthew B. McRae, Laguna Beach, CA (US); Allen J. Huotari, Garden Grove, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/057,084

(22) Filed: Feb. 29, 2016

(65) Prior Publication Data

US 2016/0205711 A1     Jul. 14, 2016

Related U.S. Application Data

(63) Continuation of application No. 14/738,576, filed on Jun. 12, 2015, now Pat. No. 9,277,574, which is a continuation of application No. 11/618,285, filed on Dec. 29, 2006, now Pat. No. 9,060,267.

(51) Int. Cl.
| | |
|---|---|
| H04W 76/02 | (2009.01) |
| H04W 12/06 | (2009.01) |
| H04W 12/08 | (2009.01) |
| H04W 12/04 | (2009.01) |
| H04W 4/00 | (2009.01) |
| H04W 84/12 | (2009.01) |

(52) U.S. Cl.
CPC ......... *H04W 76/021* (2013.01); *H04W 12/04* (2013.01); *H04W 12/06* (2013.01); *H04W 12/08* (2013.01); *H04W 76/023* (2013.01); *H04W 4/00* (2013.01); *H04W 76/02* (2013.01); *H04W 84/12* (2013.01)

(58) Field of Classification Search
CPC ..... H04W 12/04; H04W 76/02; H04W 12/06; G06F 21/445; G06F 2221/2129; H04L 2209/80; H04L 63/0823; H04L 9/0841; H04L 9/3263; H04L 9/3273
See application file for complete search history.

(56) References Cited

U.S. PATENT DOCUMENTS

| | | | |
|---|---|---|---|
| 6,063,036 A | 5/2000 | Li | |
| 6,542,610 B2 | 4/2003 | Traw et al. | |
| 6,772,331 B1 * | 8/2004 | Hind | G06F 21/445 370/313 |
| 6,783,071 B2 | 8/2004 | Levine et al. | |
| 6,886,095 B1 | 4/2005 | Hind et al. | |

(Continued)

FOREIGN PATENT DOCUMENTS

EP     1635508 A1 *   3/2006   ............. H04L 41/28

*Primary Examiner* — Matthew Sams
(74) *Attorney, Agent, or Firm* — Haynes and Boone, LLP (57) ABSTRACT

In one embodiment, a secure communication is initiated between two devices by generating a pairing message from a pre-determined static identification on the first device, transmitting the pairing message to the second device, generating a pairing identification from the static identification, and initiating a secure communication between the first and second device if the pairing message corresponds with the pairing identification.

20 Claims, 6 Drawing Sheets

(56) References Cited

U.S. PATENT DOCUMENTS

| | | |
|---|---|---|
| 7,023,994 B1 | 4/2006 | Dupre |
| 7,054,613 B2 | 5/2006 | Smeets |
| 7,130,584 B2 | 10/2006 | Hirvonen |
| 7,215,775 B2 | 5/2007 | Noguchi et al. |
| 7,373,507 B2 | 5/2008 | Simms |
| 7,489,781 B2 | 2/2009 | Klassen et al. |
| 7,738,569 B2 | 6/2010 | Quinn et al. |
| 8,099,607 B2 | 1/2012 | Sandhu et al. |
| 8,832,783 B2 * | 9/2014 | Ben-Shalom ....... H04L 63/0869 709/227 |
| 8,879,994 B2 | 11/2014 | Brown et al. |
| 8,913,957 B2 * | 12/2014 | Eun .................... H04M 1/7253 370/328 |
| 9,060,267 B2 * | 6/2015 | McRae ................. H04W 12/04 |
| 9,277,574 B2 * | 3/2016 | McRae ................. H04W 12/04 |
| 2003/0108206 A1 | 6/2003 | Diehl et al. |
| 2004/0253923 A1 | 12/2004 | Braley et al. |
| 2005/0085188 A1 | 4/2005 | Ishii et al. |
| 2006/0135064 A1 * | 6/2006 | Cho .................... H04M 1/7253 455/41.1 |
| 2006/0206710 A1 | 9/2006 | Gehrmann |
| 2007/0251997 A1 | 11/2007 | Brown et al. |
| 2008/0160914 A1 * | 7/2008 | McRae ................ H04W 12/04 455/41.2 |
| 2012/0322379 A1 * | 12/2012 | Eun .................... H04M 1/7253 455/41.2 |
| 2014/0096179 A1 * | 4/2014 | Ben-Shalom ....... H04L 63/0869 726/1 |
| 2015/0282224 A1 * | 10/2015 | McRae ................ H04W 12/04 455/39 |

* cited by examiner

SECURE PAIRING OF NETWORKED DEVICES

CROSS REFERENCE TO RELATED APPLICATIONS

This application is a continuation of U.S. patent application Ser. No. 14/738,576 filed on Jun. 12, 2015 and issued as U.S. Pat. No. 9,277,574 on Mar. 1, 2016, which is a continuation of U.S. patent application Ser. No. 11/618,285 filed on Dec. 29, 2006 and issued as U.S. Pat. No. 9,060,267 on Jun. 16, 2015, the full disclosures of which are both incorporated by reference herein in their entirety and for all purposes.

TECHNICAL FIELD

The present disclosure relates generally to wireless network security between two devices.

BACKGROUND

Wireless networking has become a mainstream technology. End users are adopting wireless technology in record numbers despite security concerns. Unfortunately, many current wireless security mechanisms demand significant user interactions including multiple steps, repetitive procedures, and out-of-band transfers of complex passwords or security indicias. Even mechanisms considered to be "simplified" may be unacceptably complex for many wireless network users or may be prone to compromise.

For example, different "push-button" methodologies are used to simplify security set-up. One current push-button security implementation is configured using a static seed value that may be determined through inspection over time and, thus, may become insecure. Another common push-button security implementation is configured using a fixed seed value, widely known to be zero, which may allow easy access to unsophisticated network interlopers. In one proposed improved security procedure, a wireless network user supplies a variable seed value for a security process by pushing a security configuration button from one to thirty-two times for each wireless device to be secured. However, even these improved procedures may be thwarted by pragmatic human limitations. For example, a typical user is unlikely to push the configuration button more than a few times, instead using just the first few values in the available range of seed values. This practice may not provide sufficient network security and may lead to an increase in technical support calls to resolve configuration errors. In another proposed improved security procedure, a wireless network user enters into an access point (AP) or wireless router an eight-digit identification number displayed on a wireless client. In addition to being cumbersome to the network user, this procedure requires an AP or wireless router to have an interface with an indicia pad, at a significant increase in cost. As a result, wireless network users may elect not to activate wireless network security mechanisms, despite the daunting risks posed by an unsecured wireless network operation.

BRIEF DESCRIPTION OF THE DRAWINGS

Same reference numbers indicate the same step or element in the figures.

DESCRIPTION

Overview

According to one aspect of the invention, a secure communication is initiated between two devices by generating a pairing message from a pre-determined static identification on the first device, transmitting the pairing message to the second device, generating a pairing identification from the static identification, and initiating a secure communication between the first and second device if the pairing message corresponds with the pairing identification.

According to another aspect, an enrollee device, such as a wireless client, generates a pairing message from a pre-determined static identification, such using a number from a MAC ID address as a seed value. The pairing message is transmitted to a registrar device, such as an access point, which then compares the pairing message to its own generated pairing identification from the pre-determined static identification. If the pairing message corresponds with the pairing identification, a secure communication with the enrollee is initiated by the registrar.

Description of Example Embodiments

Figure 1:
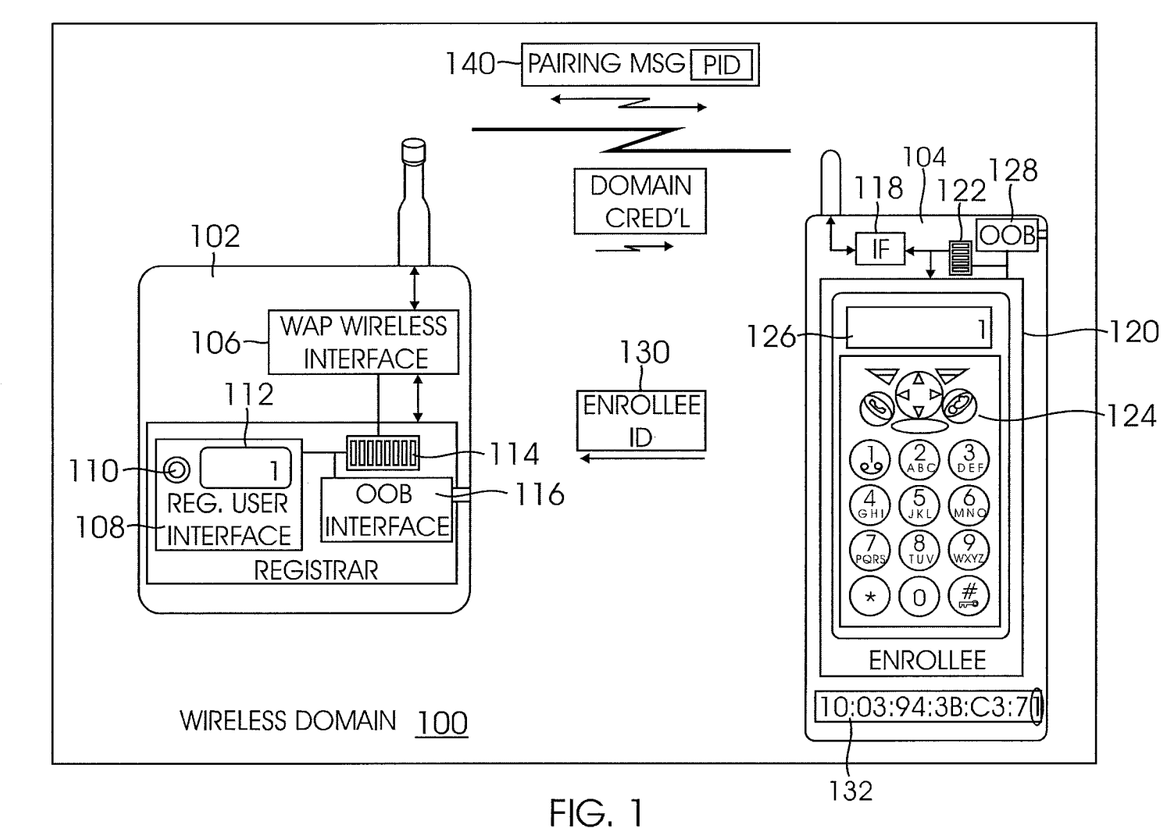
FIG. 1 shows two devices engaging in a secure communication according to one embodiment.

FIG. 1 shows one embodiment of a wireless domain 100 that includes a registrar 102, which may be a wireless access point (WAP), and an enrollee 104, which may be a wireless client. Registrar 102 employs a WAP wireless interface 106 to communicate with enrollee 104 and may be configured to bridge network communications between enrollee 104 and another network segment or network client. Registrar 102 is configured with a registrar interface 108, which may include one or both of a registrar input element 110 or a registrar display element 112. Registrar 102 also includes a registrar memory 114, which may be used to store domain membership information, such as enrollee identification. In addition, registrar 102 may be configured with an out-of-band (OOB) interface 116 to facilitate out-of-band data transfers, for example, using a portable memory device (not shown) or a mating interface connection coupled to a computing device (not shown). Examples of a mating interface connection include a wireline USB- or IEEE 1394-like interface connection or a wireless PAN interface connection, such as a Bluetooth® interface connection. Registrar memory 114 may be coupled to one or more of WAP wireless interface 106, registrar interface 108, or OOB interface 116. Examples of registrar 102 include a standalone wireless access point (WAP) or a WAP integrated within another device, such as a router or a gateway.

Similarly, enrollee 104 includes a wireless interface 118, an enrollee interface 120, and an enrollee memory 122. Wireless interface 118 may facilitate communication with registrar 102. Enrollee interface 120 includes one or both of an enrollee input element 124 or an enrollee display element 126. An OOB interface 128 can facilitate out-of-band data transfers, for example, using a portable memory device or a mating interface connection coupled to a computing device (not shown). Examples of a mating interface connection include a wireline USB- or IEEE 1394-like interface connection or a wireless PAN interface connection, such as a Bluetooth® interface connection. Enrollee memory 122 may be coupled to one or more of wireless interface 118, enrollee interface 120, or OOB interface 128. Examples of enrollee 104 include a dual-band mobile phone, a hand-held personal digital assistant, or a mobile monitor.

Registrar 102 and enrollee 104 initiate communications by "pairing," in which both devices share a code or a value to prove that both devices agree to form a trusted pair. Without loss of generality, when one device recognizes another device in an established trusted pair, each device may automatically accept communication from the other, while excluding others. It may be possible to improve pairing of wireless devices by concealing the shared value shared by registrar 102 and enrollee 104 from potential intruders. A predetermined enrollee ID 130 is used as a "shared secret" by which registrar 102 identifies enrollee 104 during registrar-enrollee (R-E) pairing. For example, enrollee 104 (or wireless client) can have a single number or letter attached to it, such as a digit from the MAC ID that is already printed on every wireless client. Unlike static pre-shared keys which may be associated and re-used with a particular domain or a particular registrar, predetermined enrollee ID 130 may be used between registrar 102 and enrollee 104, for example, only once during setup of wireless domain 100, which may include R-E pairing.

In general, predetermined enrollee ID 130 can be stored in enrollee memory 122 for later retrieval and transmission to registrar 102, for example, during R-E pairing. From a network user perspective, predetermined enrollee ID 130 may be represented by a pre-assigned indicia or by a registrar-assigned indicia. Pre-assigned indicia can be applied to enrollee 104, for example, by printing, marking, engraving, or applying an adhesive label. In one embodiment, pre-assigned indicia is a portion of a media access control identifier (MAC ID) 132 corresponding to a network interface of enrollee 104. Pre-assigned indicia also may be a product serial number or a randomly-assigned indicia provided by a manufacturer, a vendor, or a supplier. Alternatively, registrar 102 may provide predetermined enrollee ID 130 as a registrar-assigned indicia. For example, a push-button on registrar 102 can be used to generate a random non-zero PIN when the button is depressed. This non-zero PIN could then be entered into enrollee input element 124 on enrollee 104. A push-button on enrollee 104 could then be pushed to initiate a WiFi Simple Config protocol exchange.

An example of predetermined enrollee ID 130 is a single alphanumeric indicia demarcated for the convenience of a network user, as represented by registrar-assigned indicia or by pre-assigned indicia. However, enrollee ID 130, pre-assigned indicia, and registrar-assigned indicia also may be numerals, letters, symbols, or a combination thereof. Unlike security implementations subject to pragmatic human limitations or using a known or static seed value, predetermined enrollee ID 130 produced in accordance with present embodiments may be distributed over a predefined range of possible values.

Figure 2:
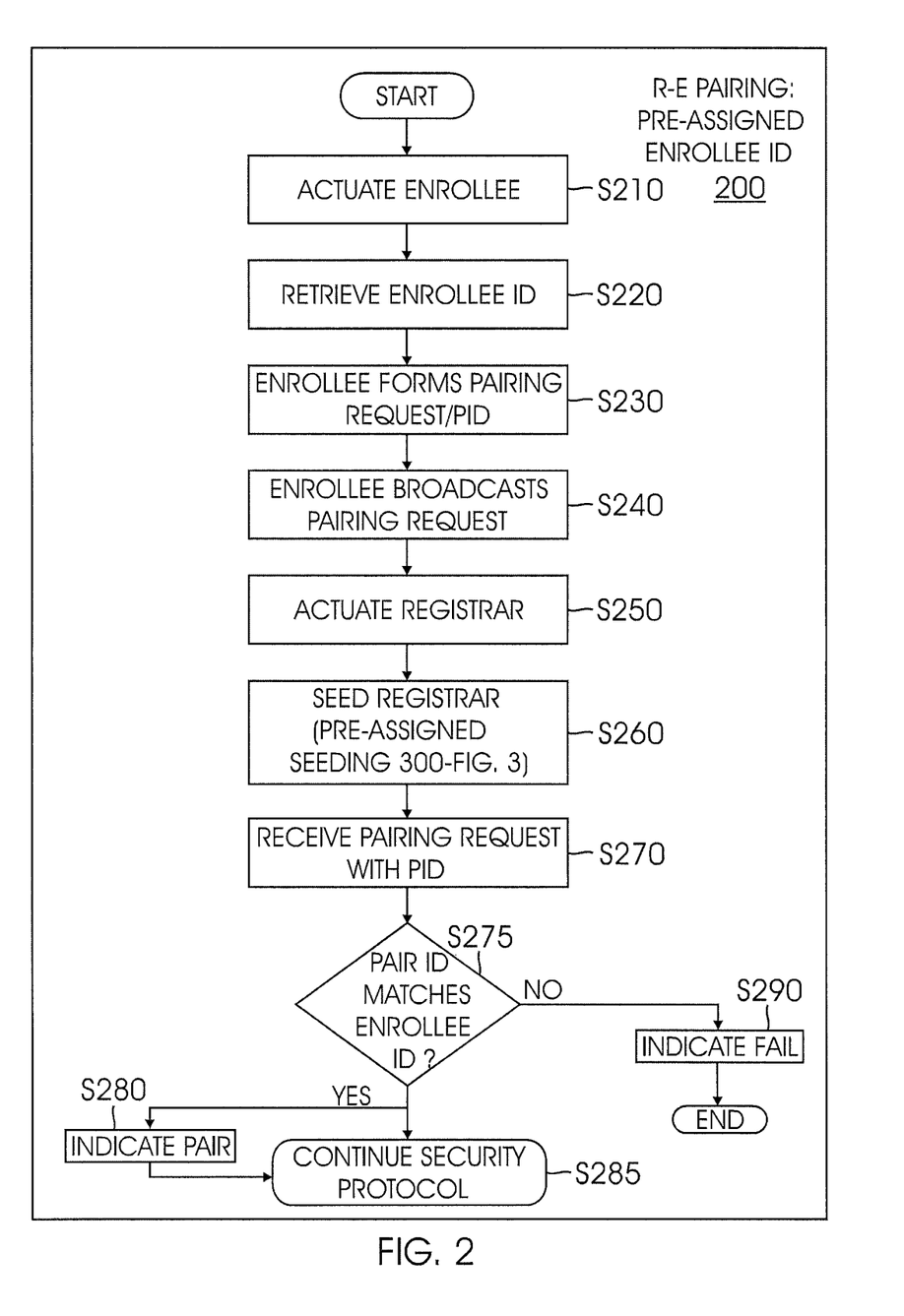
FIG. 2 is a flowchart showing one embodiment of a method of secure pairing of two devices.

FIG. 2 is a flowchart showing an example R-E pairing 200, in which predetermined enrollee ID 130 is preassigned. R-E pairing 200 is initiated by actuating (S210) enrollee 104, such as by pressing a button or key on enrollee input element 124 associated with pairing. Enrollee input element 124 may be operated by a network user (not shown) seeking to pair registrar 102 with enrollee 104. Responsive to actuating (S210), enrollee 104 retrieves (S220) enrollee ID 130, which may be determined and stored in enrollee memory 122, for example, by a manufacturer, supplier, or vendor. Typically, predetermined enrollee ID 130 corresponds to pre-assigned indicia. Enrollee 104 uses enrollee ID 130 as a pairing ID to form (S230) a pairing message 140 (FIG. 1), which enrollee 104 broadcasts (S240) to seek a pairing partner. Registrar 102 is actuated (S250), for example, by operating registrar input element 110, which may be a button or key associated with the pairing.

In response to being actuated (S250), registrar 102 is seeded (S260) with predetermined enrollee ID 130, in accordance with a preselected seeding procedure. In certain preselected seeding procedure implementations, predetermined enrollee ID 130 may be represented by pre-assigned indicia 132, which may be input into registrar 102, also by operating registrar input element 110. One example of a preselected seeding procedure includes pre-assigned seeding procedure 300, which will be discussed with reference to FIG. 3. Registrar 102 then receives (S270) incoming pairing message 140 from a prospective enrollee and compares (S275) the pairing ID (PID) with predetermined enrollee ID 130. If the pairing ID matches predetermined pre-assigned enrollee ID 130 (as determined by a processor or the like in registrar 102), registrar 102 indicates (S280) a successful pairing with enrollee 104 and continues to engage (S285) with enrollee 104 in a pre-selected security protocol. The pre-selected security protocol may be a WLAN authentication or encryption specification, including, for example, those in accordance with a Wired Equivalence Privacy (WEP) protocol, a WiFi Protected Access (WPA) protocol, a WiFi Protected Access 2 (WPA2) protocol, or a WiFi Protected Setup™ protocol, as promulgated by the wireless industry organization, WiFi® Alliance, Austin, Tex., USA. However, if the pairing ID does not match (S275) predetermined pre-assigned enrollee ID 130, one or both of registrar 102 or enrollee 104 may indicate a failed pairing (S290). Alternatively, registrar 102 may ignore enrollee 104 with no indication.

Figure 3:
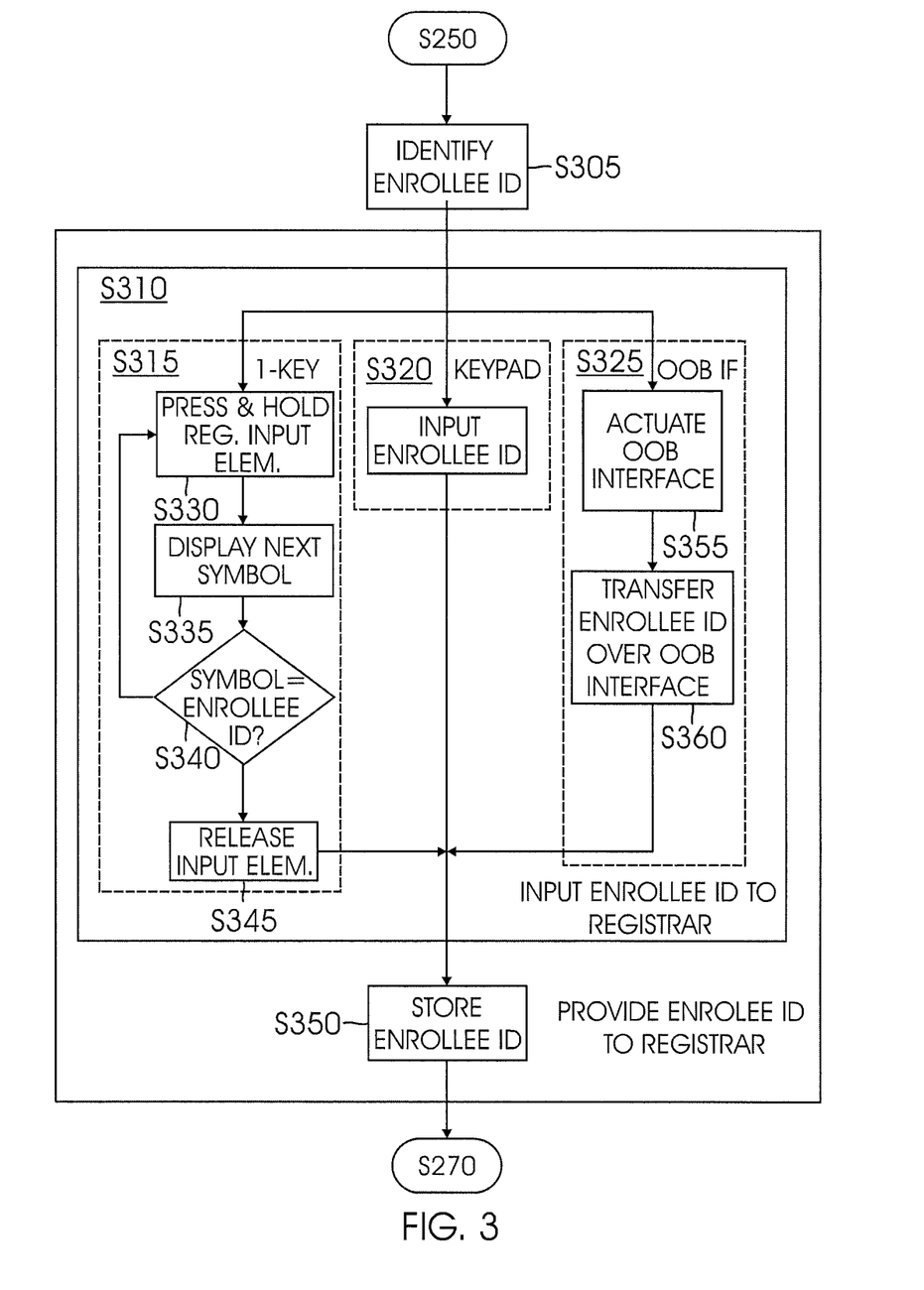
FIG. 3 is a flowchart showing one embodiment of pre-assigned seeding for use in the flowchart of FIG. 2.

FIG. 3 shows one example of a preselected seeding procedure 300 (pre-assigned seeding) for use in S260 of FIG. 2. Predetermined enrollee ID 130 is first obtained (S305), for example, from pre-assigned indicia 132. Predetermined enrollee ID 130 is then input (S310) to registrar 102 in one of three methods, although other methods may also be suitable. In a first method (S315), registrar input element 110 is actuated using a single button or key. In some single-button implementations, registrar input element 110 is actuated by pressing (S330) using a single press, multiple presses, or a sustained press (i.e., press and hold). Pressing (S330) causes registrar 102 to select and indicate (S335) on registrar display element 112, one or more symbols which may be representative of predetermined enrollee ID 130. If the displayed symbol corresponds to predetermined enrollee ID 130 (S340), input element 110 is released (S345), which causes registrar 102 to store (S350) predetermined enrollee ID 130 in registrar memory 114. Registrar 102 is configured with a single button implementation where a simple registrar interface may be desirable. Interface display 112 may be a simple audio display capable of providing a perceptible indication of symbols (visual or aural) indicative of enrollee ID 130.

In a second method (S320), registrar input element 110 is a multi-key pad actuated by keystrokes corresponding to preassigned indicia 132 and, by extension, to enrollee ID 130.

In a third method (S325), predetermined enrollee ID 130 is input to registrar 102 by actuating (S355) OOB interface 116 and transferring (S360) predetermined enrollee ID 130 to registrar 102 over OOB interface 116. For example, predetermined enrollee ID 130 may be stored on a portable memory card (not shown) and transferred (S360) over OOB interface 116 by a mating interface connection and stored (S350) in registrar memory 114. In another embodiment of the third method, enrollee ID 130 is input (S360) via registrar OOB interface 116 using a configuration wizard program. For example, the user could push and hold a button on registrar 102 (e.g., an access point) with a display until the client value appears. The user then releases the button to set the same value for registrar 102 and finish the pairing mechanism.

Figure 4:
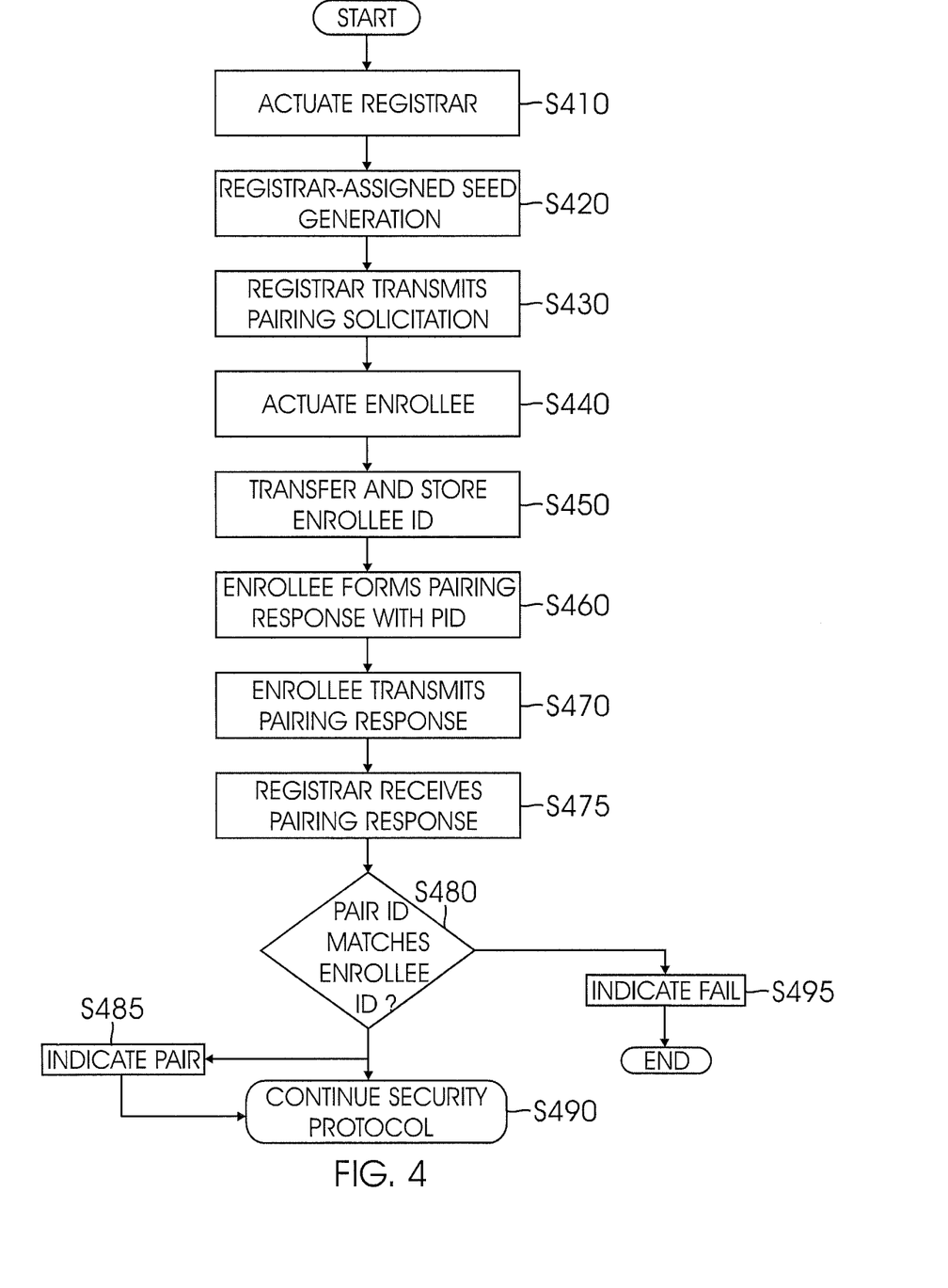
FIG. 4 is a flowchart showing another embodiment of a method of secure pairing of two devices.
Figure 5A:
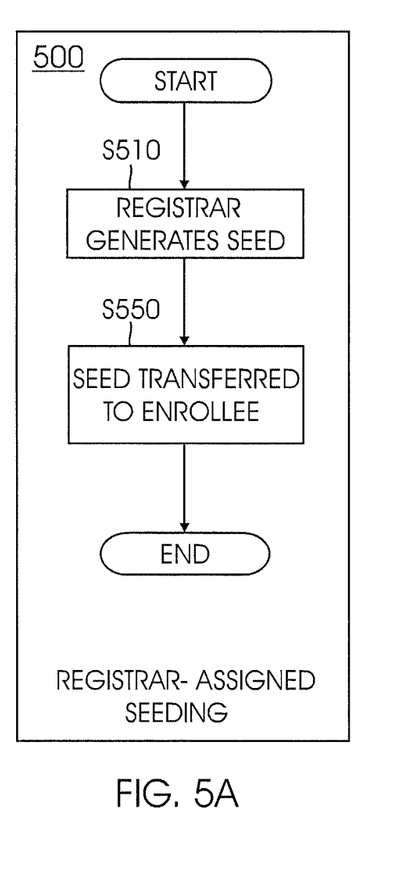
FIG. 5A is a flowchart showing one embodiment of registrar-assigned seed generation for use in the flowchart of FIG. 4.
Figure 5B:
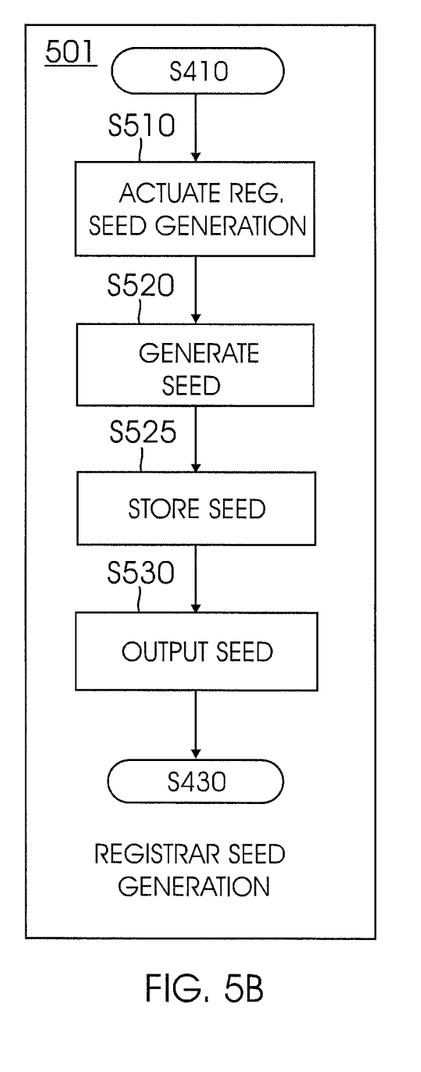
FIG. 5B is a flowchart showing one embodiment of registrar seed generation for use in the flowchart of FIG. 5A.
Figure 5C:
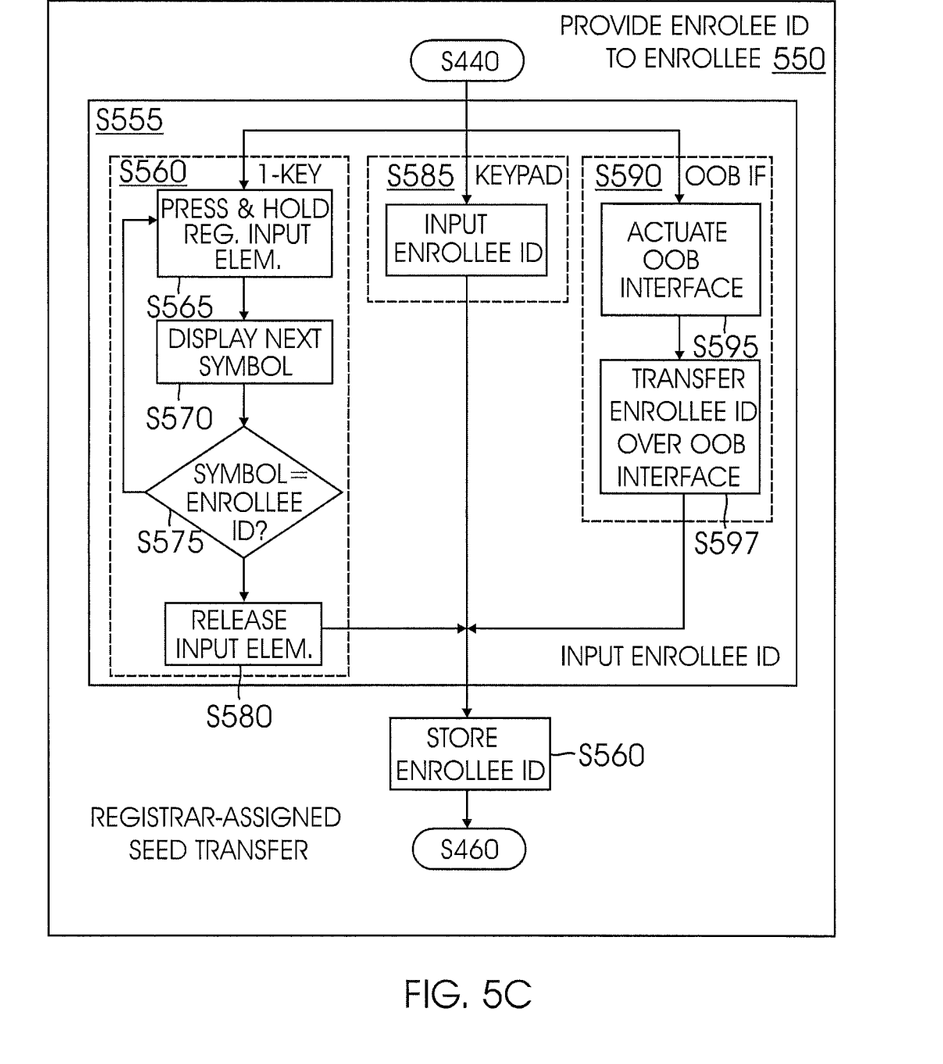
FIG. 5C is a flowchart showing one embodiment of registrar-seed transfer for use in the flowchart of FIG. 5A.

FIG. 4 is a flow chart showing one example of an R-E pairing 400 (registrar-assigned enrollee ID), in which predetermined enrollee ID 130 is assigned by a preselected seeding procedure generally typified by a registrar-assigned seeding procedure 500, as illustrated with respect to FIGS. 5A-C. R-E pairing 400 is initiated by actuating (S410) registrar 102, for example, by operating registrar input element 110. Registrar input element 110, such as a button or key associated with pairing, may be operated by a network user (not shown) seeking to pair registrar 102 with enrollee 104. Responsive to actuating (S410), registrar 102 generates (S420) a seed representative of predetermined enrollee ID 130. One example of a seed generation procedure, suitable for S420 is a registrar seed generation 501 in FIG. 5B. Registrar seed generation 501 is a first phase of registrar-assigned seeding procedure 500. Seed generation by the registrar, for example, creates a personal identification number (PIN) based on the enrollee ID.

Responsive to the seed generation procedure, registrar 102 produces a registrar-assigned indicia on registrar display 112. The indicia may be selected as predetermined enrollee ID 130. Registrar 102 then broadcasts (S430) a pairing solicitation to prospective enrollees, which may include enrollee 104. To form a trusted pair, enrollee interface 118 is operated to actuate (S440) enrollee 104. Responsive to being actuated, enrollee 104 receives and stores (S450) the seed corresponding to predetermined enrollee ID 130, for example, in accordance with a selected seed transfer procedure. A registrar-assigned seed transfer 551 in FIG. 5C is one example of a seed transfer procedure, suitable for implementing S450, and also may be a second phase of registrar-assigned seeding procedure 500.

Actuated enrollee 104 forms (S460) pairing message 140 using enrollee ID 130 as the pairing ID and exchange (S470) pairing message 140 with registrar 102. Registrar 102 then receives (S475) pairing message 140 from enrollee 104 and compares (S480) the pairing ID with registrar-assigned predetermined enrollee ID 130 that was generated (S420) to facilitate pairing with enrollee 104. When the pairing ID matches predetermined registrar-assigned enrollee ID 130, registrar 102 indicates (S485) a successful pairing with enrollee 104. Registrar 102 and enrollee 104 can then engage (S490) in a pre-selected security protocol, which may be a WLAN authentication or encryption specification, such as those in accordance with a Wired Equivalence Privacy (WEP) protocol, a WiFi Protected Access (WPA) protocol, a WiFi Protected Access 2 (WPA2) protocol, or a WiFi Protected Setup™ protocol, as promulgated by the wireless industry organization, WiFi® Alliance. If the pairing ID does not match with enrollee ID 130 (S480), the attempted pairing is indicated as having failed (S495) or just ignored, without giving any indication.

FIG. 5A illustrates one example of a registrar-assigned seeding procedure 500, which includes registrar seed generation 501 and registrar-assigned seed transfer 550. FIG. 5B shows one example of registrar seed generation 501, and FIG. 5C shows one example of registrar-assigned seed transfer 550.

In FIG. 5B, registrar seed generation 501 is initiated by actuating (S510) registrar seed generation in registrar 102, for example, by pressing registrar input element 110. In response, registrar 102 generates (S520) a seed value, which may be associated with enrollee ID 130. For example, registrar 102 generates the seed value by a single push or by a sustained push, where the seed value is distributed within a preselected seed value range. The seed value may correspond to enrollee ID 130, or another seed value may be generated. Once the seed value is generated, it is stored (S525) in registrar 102, such as in memory 114. Registrar 102 then outputs (S530) the seed value, for example, by producing display on registrar display element 112. Storing (S525) and outputting (S530) may be performed in any order relative to one another. The seed value is used by registrar 102 as predetermined enrollee ID 130 for comparison with a received pairing ID, as may be used in an embodiment of R-E pairing 400.

In FIG. 5C, registrar-assigned seed transfer 550 includes providing (S555) registrar-assigned predetermined enrollee ID 130 to enrollee 104 and storing (S560) registrar-assigned predetermined enrollee ID 130 in enrollee 104. Registrar-assigned predetermined enrollee ID 130 may be used subsequently by enrollee 104 for forming a pairing ID to be transmitted to registrar 102, as may be used in an embodiment of R-E pairing 400 (e.g., S460). Providing registrar-assigned predetermined enrollee ID 130 to enrollee 104 is implemented, for example, by one of three methods, although other methods may also be suitable. In a first method (S560), enrollee input element 124 is actuated using a single button or key. In some single-button implementations, enrollee input element 124 is actuated by pressing (S565) using a single press, multiple presses, or a sustained press (i.e., press and hold). Pressing (S565) causes enrollee 104 to select and indicate (S570) on enrollee display element 126, one or more symbols which may be representative of predetermined enrollee ID 130. If the displayed symbol corresponds to predetermined enrollee ID 130 (S575), input element 124 may be released (S580), which causes enrollee 104 to store (S560) predetermined enrollee ID 130 in enrollee memory 122. Enrollee 104 may be configured with a single button implementation where a simple registrar interface may be desirable, due to the relative simplicity of use by a network user. Interface display 126 may be a simple audio display capable of providing a perceptible indication of symbols (visual or aural) indicative of enrollee ID 130.

In a second method (S585), enrollee input element 124 is a multi-key pad actuated by keystrokes corresponding to preassigned indicia 132 and, by extension, to enrollee ID 130.

In a third method (S590), predetermined enrollee ID 130 is input to enrollee 104 by actuating (S595) OOB interface 128 and transferring (S597) predetermined enrollee ID 130 to enrollee 104 over OOB interface 128. For example, predetermined enrollee ID 130 may be stored on a portable memory card (not shown) and transferred (S597) over OOB interface 128 by a mating interface connection and stored (S560) in enrollee memory 122. In another embodiment of the third method, enrollee ID 130 is input (S597) via enrollee OOB interface 128 using a configuration wizard program or on another computing device (not shown), to which enrollee OOB interface 128 may be coupled. For example, the user could push and hold a button on enrollee 104 with a display until the client value appears. The user then releases the button to set the same value for enrollee 104 and finishes the pairing mechanism.

Seed generation by the registrar, for example, in creating a personal identification number (PIN) based on the enrollee ID can be used when the enrollee has a user interface and the push button on the enrollee has not been pushed first. The pushbutton on the registrar can be used to generate a random non-zero PIN when the button is pushed. This non-zero PIN would then be entered into the user interface on the enrollee. The button would then be pushed on the enrollee and WiFi Simple Config protocol exchange would occur, as discussed above. One advantage this provides is in allowing the registrar to discriminate the instance of multiple enrollees. Since the registrar selects the non-zero PIN instead of the enrollee, the registrar knows to only admit the enrollee with the shared secret that was generated by the registrar.

Although embodiments are described within a wireless networking context, in which networked devices communicate over unguided media using wireless elements and wireless networking protocols, certain embodiments also may be implemented within a wireline networking context, in which networked devices communicate over guided media using hardwired elements and wireline networking protocols. For example, one or both of registrar 102 or enrollee 104 may also be integrated within other devices capable of being networked, such as a computer, a hand-held personal digital assistant, a home entertainment device, a multifunction television, a home security device, or a wireline telephone. Accordingly, ones of the certain embodiments may communicate using a wireline networking protocol, such as an Ethernet/IEEE 802.3 LAN protocol, a power line protocol, a telephone line protocol, or a cable network protocol. Examples include HomePlug and MoCA.

Advantages of the present invention include 1) only requiring possibly a single sustained push on the registrar, such as an AP, and a single push on the enrollee or client, 2) an even distribution of the seed value over a wide range if the number is determined by the MAC ID address or other string of numbers on the enrollee, as compared to prior methods which may practically only use the first few values in a range, and 3) simply and inexpensive implementation, e.g., no cost to the enrollee or client and only an inexpensive display on the registrar.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A device comprising:
a communication interface; and
a processor coupled to the communication interface and configured to:
transmit a device identifier to a second device via the communication interface;
receive a first pairing identifier from the second device via the communication interface, the first pairing identifier being generated from the device identifier;
receive a second pairing identifier input by a user; and
establish a secure connection with the second device based on a determination whether the first pairing identifier and the second pairing identifier match.

2. The device of claim 1, wherein the device identifier is one or more digits or letters of a medium access control (MAC) address of the device.

3. The device of claim 1, wherein the first pairing identifier is randomly generated from the device identifier.

4. The device of claim 1, wherein the device identifier is a serial number of the device.

5. The device of claim 1, wherein the processor is further configured to transmit the device identifier in response to a button press on the device.

6. The device of claim 1, wherein to receive the second pairing identifier input by the user, the processor is configured to:
display, in sequence, a plurality of possible identifiers using a display element in response to the receiving of the first pairing identifier from the second device and prior to receiving another pairing identifier from the second device; and
select one of the plurality of possible identifiers as the second pairing identifier based on activation of a button by the user.

7. The device of claim 1, wherein the device is a registrar device and the second device is an enrollee device.

8. The device of claim 1, wherein the device is an enrollee device and the second device is a registrar device.

9. A method comprising:
transmitting, on a communication interface of a first device, a device identifier to a second device;
receiving, via the communication interface, a first pairing identifier from the second device, the first pairing identifier being generated from the device identifier;
receiving, on the first device, a second pairing identifier input by a user; and
establishing a secure connection between the first device and the second device based on a determination whether the first pairing identifier and the second pairing identifier match.

10. The method of claim 9, wherein the device identifier is one or more digits or letters of a medium access control (MAC) address of the first device.

11. The method of claim 9, wherein the first pairing identifier is randomly generated from the device identifier.

12. The method of claim 9, wherein the device identifier is based on a serial number of the first device.

13. The method of claim 9, further comprising transmitting the device identifier to the second device in response to a button press on the first device.

14. The method of claim 9, wherein receiving the second pairing identifier input by the user comprises:
displaying, in sequence, a plurality of possible identifiers using a display element of the first device in response to the receiving of the first pairing identifier from the second device and prior to receiving another pairing identifier from the second device; and
selecting one of the plurality of possible identifiers as the second pairing identifier based on activation of a button by the user.

15. The method of claim 9, wherein the first device is a registrar device and the second device is an enrollee device or the first device is an enrollee device and the second device is a registrar device.

16. A system comprising:
   means for transmitting a device identifying means of the system to another device;
   means for receiving a first pairing identifying means from the another device, the first pairing identifying means being generated from the device identifying means;
   means for receiving a second pairing identifying means received from a user by an input means; and
   means for establishing a secure connection with the another device based on a determination whether the first pairing identifying means and the second pairing identifying means match.

17. The system of claim 16, wherein the device identifying means is one or more digits or letters of a media access control (MAC) identifying means of the system.

18. The system of claim 16, wherein the first pairing identifying means is randomly generated from the device identifying means.

19. The system of claim 16, wherein the device identifying means is based on a serial number of the system.

20. The system of claim 16, wherein the means for transmitting the device identifying means transmits the device identifying means in response to detection of a user input on the input means.

* * * * *